P. GALVIN.
HOISTING AND CONVEYING APPARATUS.
APPLICATION FILED FEB. 11, 1914.
1,198,833.
Patented Sept. 19, 1916.
4 SHEETS—SHEET 1.
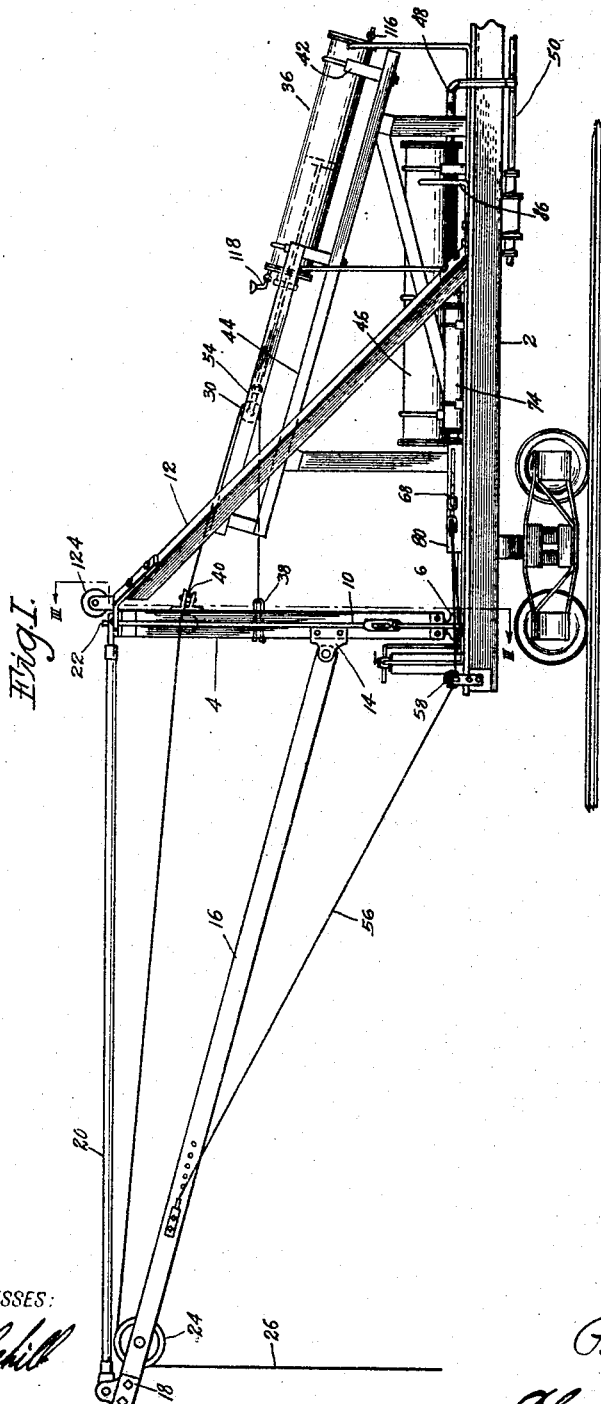
WITNESSES:
Edmund L Cahill
N. Gerard
INVENTOR
P. Galvin
BY
Chas W Gerard
His ATTORNEY P. GALVIN.
HOISTING AND CONVEYING APPARATUS.
APPLICATION FILED FEB. 11, 1914.
1,198,833.
Patented Sept. 19, 1916.
4 SHEETS—SHEET 2
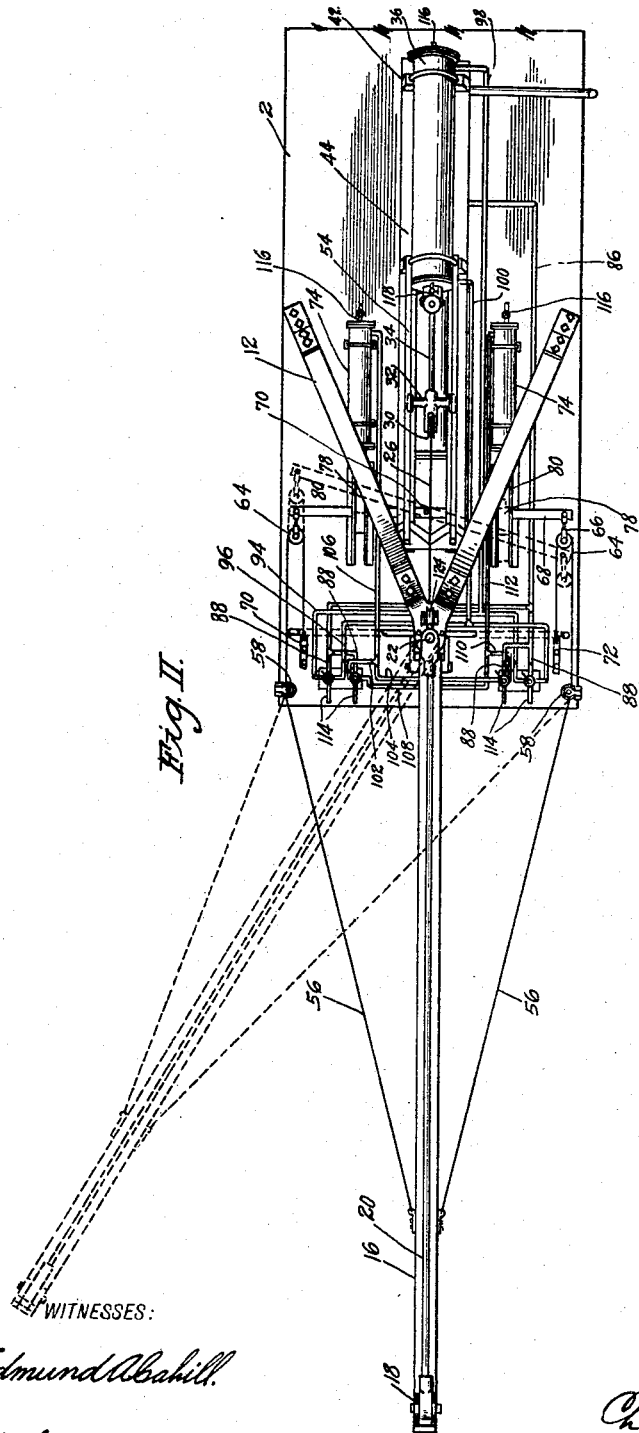
Fig. II.
WITNESSES:
Edmund A Cahill
N. Gerard
INVENTOR
P. Galvin
BY
Chas V. Genrod
His ATTORNEY P. GALVIN.
HOISTING AND CONVEYING APPARATUS.
APPLICATION FILED FEB. 11, 1914.
1,198,833.
Patented Sept. 19, 1916.
4 SHEETS—SHEET 3.
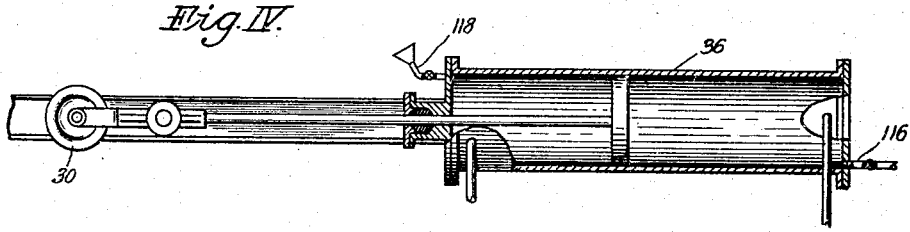
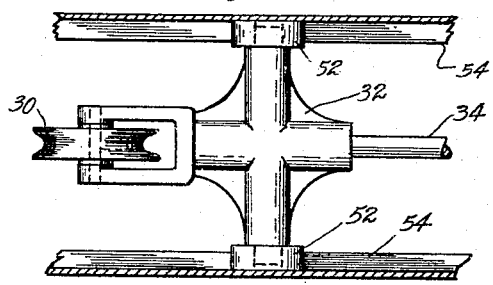 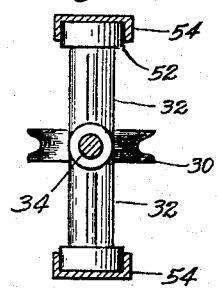
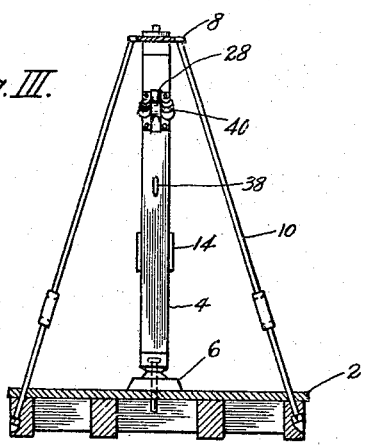
WITNESSES:
INVENTOR
P. Galvin
BY
His ATTORNEY

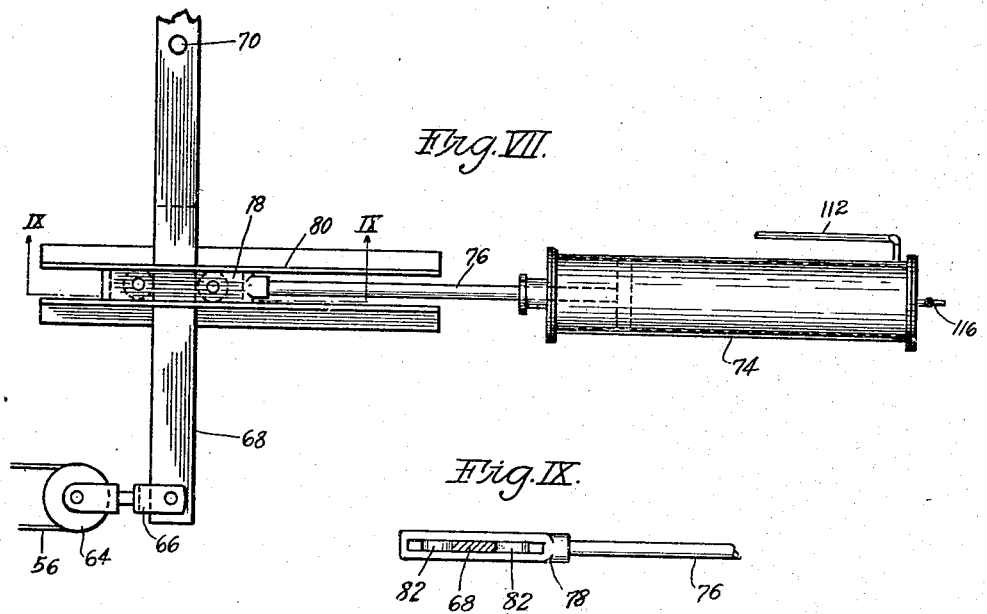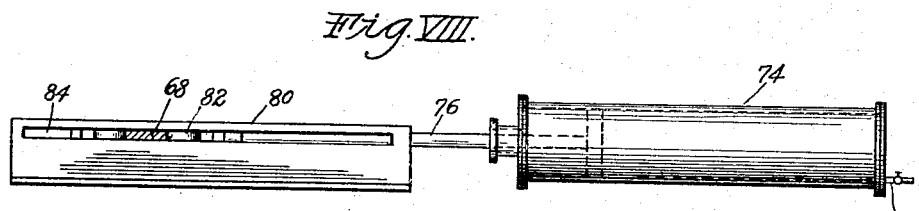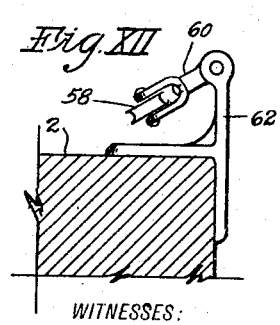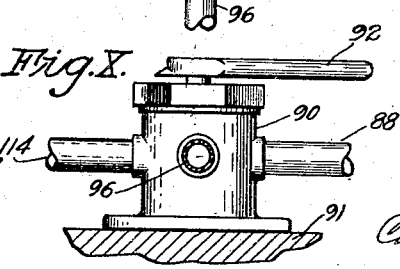

UNITED STATES PATENT OFFICE.

PATRICK GALVIN, OF OSAWATOMIE, KANSAS.

HOISTING AND CONVEYING APPARATUS.

1,198,833.   Specification of Letters Patent.   Patented Sept. 19, 1916.

Application filed February 11, 1914. Serial No. 818,032.

*To all whom it may concern:*

Be it known that I, PATRICK GALVIN, a citizen of the United States, residing at Osawatomie, in the county of Miami and State of Kansas, have invented a new and useful Hoisting and Conveying Apparatus, of which the following is a specification.

This invention has reference to machines for handling rails or other material, the principal object in view being to devise an apparatus for facilitating the handling of railroad rails where the same are to be loaded or unloaded from railroad cars, or otherwise manipulated.

To this end the invention comprises an improved arrangement of hoisting and conveying means whereby the rails, or other material being handled may be lifted and swung into or out of a given position, together with provision for controlling said means from any one of several different positions, for the convenience of the operator in observing the various movements of the device.

The apparatus is preferably associated with a flat-car in duplex form, at opposite ends of the car, and the motive devices for the apparatus comprise compressed-air cylinders deriving their air-supply from the train pipe of the car.

The invention will now be described in detail with reference to one embodiment of the same, illustrated in the accompanying drawings, in which—

Figure 1 is a side elevation of one end of a flat car having mounted thereon a rail-handling apparatus embodying my improvements; Fig. 2 is a plan view of the same, with dotted lines representing an altered position of the rail-handling mechanism; Fig. 3 is a section on the line III—III of Fig. 1, with certain parts omitted; Fig. 4 is a broken longitudinal sectional view through the hoisting cylinder, and Figs. 5 and 6 are sectional details of its piston-rod connections; Figs. 7 and 8 are plan and side views, respectively, of one of the cylinders for laterally swinging the boom, together with its operating connections; Fig. 9 is a section on the line IX—IX of Fig. 7; Fig. 10 is an elevation of one of the valve connections, and Fig. 11 is a transverse section through the same; Fig. 12 is a sectional detail showing one of the sheave-blocks and brackets for the boom-swinging cable.

In the drawings, which illustrate the apparatus at only one end of the car 2, the mast 4 is shown as supported for pivotal movement about a vertical axis upon a center-plate 6, the upper end of the mast being pivotally held by a head-plate 8, which is braced from the floor of the car by means of the lateral turnbuckle rods 10 and the rearwardly extending stay-beams 12. Intermediate its ends the mast is provided with a pair of brackets 14 to which is pivoted, for vertical swinging movement, the rear end of a boom 16. On the outer end of the boom is mounted a bracket 18 within which is pivoted one end of a supporting pipe 20 having its other end swiveled for lateral movement upon the upper pivot pin 22 of the mast. Near the outer end of the boom is journaled a sheave 24 over which operates the hoisting cable 26. This cable leads back to the mast where it is carried over a sheave 28 mounted within the mast near its upper end, and thence around a sheave 30 carried by a slide member 32 connected to the piston rod 34 of the air cylinder 36. After passing around the sheave 30, the end of the cable 26 is fixed to a U-bolt 38 at about the mid-point of the mast 4. A pair of sheaves 40 is provided at opposite sides of the sheave 28 for contact with the cable in the swinging movements of the boom.

The cylinder 36 is mounted in an inclined position upon supporting blocks 42 carried by an inclined frame-work 44 which overlies a compressed-air storage tank 46 having suitable pipe-connection 48 with the train-pipe 50 of the car. This position of the cylinder brings its piston rod in an almost direct line with that portion of the cable 26 passing over the sheave 28, and thereby greatly facilitates the hoisting operation of said cable. The slide member 32 to which the piston rod is connected is provided with rollers 52 operating along a pair of channel tracks 54 carried by the frame-work 44, which construction serves to remove any lateral strain from the piston rod due to the swinging of the boom as well as to guard against any twisting tendencies of the cable.

To each of the opposite sides of the boom is adjustably secured a cable 56 which passes rearward around a sheave 58 journaled in a block 60 swiveled in a bracket 62 on the corresponding corner of the car. From the sheaves 58 the cables 56 are carried around sheaves 64 having swivel connections 66 with the opposite ends of a cross-beam 68 which is pivoted at its mid-point 70 upon the floor of the car. After passing around the sheaves 64, the cables 56 are led forward to fixed brackets 72 adjacent the brackets 62.

The beam 68 is operated to swing the boom by means of a pair of air cylinders 74 located on opposite sides of the frame-work 44. The piston rod 76 of each of the cylinders 74 is provided with a slide member 78 operating between guides 80 and equipped with rollers 82 for embracing the opposite sides of the adjacent arm of the beam 68. The guides 80 are also formed with guide-ways 84 for accommodating the movements of the beam and at the same time providing keepers therefor.

The system of air connections between the storage tank 46 and the several cylinders, and the means for controlling the same, comprise a pipe 86 leading from said tank and provided with branches 88 communicating with two sets of valves 90 carried by posts 91, one adjacent each of the corners of the corresponding end of the car. These valves are of the 4-way type (see Figs. 10 and 11) provided with convenient operating handles 92, and one valve of each set is also provided with pipes 94 and 96 communicating through pipes 98 and 100, respectively, with the opposite ends of the cylinder 36. The other valves of each set are similarly provided with pipes 102 and 104, respectively, which communicate with a pipe 106 leading to one of the cylinders 74, and also with pipes 108 and 110, respectively, communicating with a pipe 112 leading to the other cylinder 74. Each valve also has an outlet passage 114 whereby either of its cylinder pipes may be placed in communication with the atmosphere (see Fig. 11) to permit the exhaust of air from such pipes. It will thus be understood that the piston of cylinder 36 has a working stroke in both directions, while those of the other cylinders are operated by air power in only one direction, it being noted that the forward face of each of the pistons of cylinders 74 is open to atmospheric pressure, and that, consequently, each of said pistons is relied upon to accomplish the reverse stroke of the other. Each of the air cylinders is provided with a valve-controlled drain outlet 116, and the cylinder 36 is also provided with a valve-controlled passage 118 at its forward end for oiling purposes, the outlet 116 of said cylinder serving also as an air exhaust in case it should be desired to operate its piston with but one working stroke, and permit the weight of the parts carried by the hoisting cable to return the piston to its forward position.

In the operation of the apparatus, any suitable grapple device (not shown) is provided on the free end of the cable 26, and the operator takes his position at either corner of the car, according to the direction in which it is desired to swing the boom. By manipulation of the outer valve handle 92, the admission of air from the storage tank into the cylinder 36 is controlled for lowering or raising the hoisting cable 26, and as soon as the load has been elevated the proper distance, the inner valve is operated to swing the boom laterally about the axis of the mast by the admission of air into the appropriate cylinder 74, for the purpose of conveying the material into the proper position for the further operation of the hoisting cylinder to lower and release the load. It will be obvious, of course, that in actual operation the control will be such that the hoisting and conveying movements will take place more or less simultaneously.

When the apparatus is not in use, suitable supports (not shown) may be provided for disposing the boom and brace pipe 20 within the frame work 44 over the storage tank, and a pulley 124 is mounted at the top of the mast for the purpose of permitting the cable 26 to be used in connection with said pulley for conveniently lowering the boom, the pipe 20 being detached from the pin 22 and the boom being gradually lowered by means of said cable after the latter has been attached either to the boom or to its brace. The boom may then be disconnected from the brackets 14 and shifted rearward into position on the car.

While the foregoing represents what is now conceived to be the preferred form of embodiment of my improvements, I desire to reserve the right to all such changes and modifications as may fairly fall within the scope of the following claims.

I claim:

1. A hoisting and conveying apparatus comprising, in combination with a car, a boom mounted upon said car for movement about a vertical axis, a hoisting cable operating over said boom, compressed-air operating mechanism provided with connections for operating said hoisting cable and moving the boom about the axis, and means whereby said operating mechanism for the hoisting cable and for moving the boom about its axis may be controlled from either side of the car.

2. A hoisting and conveying apparatus comprising, in combination with a car, a boom mounted upon said car for movement about a vertical axis, a hoisting cable operating over said boom, independent air cylinders provided with operative connections with said hoisting cable and said boom respectively, and valve connections at both sides of the car for severally controlling the admission of air to all said cylinders from either side of the car.

3. In a hoisting apparatus, a vertical mast, a boom pivoted to said mast intermediate the ends thereof, a pulley carried by the mast below its top, a hoisting cable normally operating over said pulley, a supporting member pivoted to the outer end of the boom, another pulley mounted at the upper end of said mast, and a detachable connection between said supporting member and the upper end of the mast, whereby said member may be detached from the mast and connected to said cable when shifted to said pulley for lowering the boom.

4. The combination with a boom mounted for movement about a vertical axis, a horizontally swinging beam intermediately pivoted and provided with operating connections between its opposite ends and the opposite sides of said boom, horizontal guide members having guide passages for the opposite ends of said beam, and an air-cylinder associated with each of the opposite ends of said beam, each of said cylinders being provided with a piston slide member having rollers engaging the opposite side edges of the beam, said guide members being formed with longitudinal guideways intersecting said guide passages for slidingly accommodating each of said slide members.

5. The combination with a boom, of a hoisting cable operating over said boom, a reciprocating rod provided with a sheave engaging said cable, a pair of channel guides on opposite sides of said rod, and a cross head secured to said rod, a roller journaled on each end of the cross head parallel to the transverse axis thereof, said rollers fitting in the channels of the guides and running on the flanges thereof for preventing lateral twisting or rotation of said rod.

PATRICK GALVIN.

Witnesses:
  FRED T. HADDOCK,
  JNO. R. LIEGBY.

Copies of this patent may be obtained for five cents each, by addressing the "Commissioner of Patents, Washington, D. C."